Patented July 7, 1931

1,813,371

UNITED STATES PATENT OFFICE

WILLIAM HENRY WHATMOUGH, OF LONDON, ENGLAND, ASSIGNOR TO STANDARD PRODUCTS CORPORATION, A CORPORATION OF NEW YORK

COMPOSITE LAKE PIGMENT

No Drawing. Original application filed January 30, 1926, Serial No. 85,025, and in Great Britain December 7, 1925. Divided and this application filed August 25, 1926. Serial No. 131,550.

This invention relates to composite lake pigments containing oleaginous substances and includes the process of manufacturing these novel pigments.

It is desirable to incorporate lake pigments in dispersions of oils, waxes and similar oleaginous materials for use in typewriter ribbons, carbon paper and many other uses. Hitherto, such incorporation has been made by dispersing the finished pigment in the dispersion of oleaginous substances in water or in other oleaginous media. This procedure has been open to many disadvantages as in the case of numerous pigments, it is difficult to satisfactorily disperse them and as the dispersions are frequently not stable over long periods of time, it has been necessary to use the dispersion very shortly after formation or to incorporate relatively large amounts of stabilizers or deflocculating agents, such as gums and the like which are frequently undesirable.

It is an object of the present invention to prepare composite lake pigments containing oleaginous materials which can be readily and easily dispersed in dispersions of the oleaginous material in water or in other oleaginous media and which will keep in a paste or powder form without the aid of stabilizing agents. Other and further objects will appear from the more detailed description of the invention which follows.

According to the present invention, lake pigments, either simple or complex, are precipitated in a dispersion of the oleaginous material desired. The precipitated pigment carries down substantially all of the oleaginous material within wide limits and the resulting product which is usually in the form of a powder or paste can be washed with water to remove soluble salts with little or no loss of the oleaginous component. The product keeps well and can be readily dispersed in a suitable dispersing medium with a minimum of effort.

The lake pigments of the present invention may be simple or complex pigments, that is to say, they may be formed by a reaction between the dye and the substrate or an insoluble pigment may be precipitated or struck on the substrate by causing the dye to react with other compounds in the presence of the substrate. The formation of the lake in each case takes place in the presence of a dispersion of the desired oleaginous material, which is practically completely precipitated with the pigment within wide limits.

The formation of the lake pigment may be carried out in various ways, all of which are included in the invention. Thus, a dispersion of the oleaginous material in water can be incorporated with a solid substrate, the latter being homogeneously dispersed throughout the mixture. Solutions containing the components of the colored pigment may then be added to the dispersion of oleaginous material and substrate. Pigments may also be made by dispersing the oleaginous material in a dispersion of the substrate or in a solution of one or more of the soluble pigment components. If the oleaginous dispersion is in the presence of the substrate, the pigment components may be added in the form of water solutions or oleaginous dispersions. If the primary volume of oleaginous dispersion is in the presence of one of the pigment components, the substrate should then be dispersed throughout the mixture before adding the final pigment component which brings about precipitation of the final product. There are many other possible combinations which are included within the invention, and it should be understood that the invention in its broader aspects is not concerned with the particular order in which the various components of the dispersions are introduced.

A very large number of lake pigments can be prepared and are included in the present invention, which is not in any sense limited to the pigments which will be described by way of specific example, and which are intended to be illustrative of the invention without in any sense limiting it. The oleaginous material which can be used to form the dispersion includes a large number of materials which are characterized by their physical oiliness. For example, dispersions of carnauba wax, beeswax, mineral oil, petrolatum, castor oil, linseed oil and similar products may be used.

While these compounds differ widely in their chemical characteristics, they all possess the physical characteristics of oiliness or waxiness, on which their utility in the present invention depends. Accordingly, the word oleaginous is intended to relate to the physical characterists of the product and not to their chemical nature. Single oleaginous materials may be used, or a mixture of different materials.

The character of the substrate which is used in the formation of the lake pigments of the present invention is not limited by the specific pigments which will be described. On the contrary, any base material or substrate, such as barium sulphate, aluminum hydroxide and other well known materials may be used as substrates on which to strike a dye, which may be a coal tar dye or any other suitable dye.

Example I 60 kg. of methyl violet are dissolved in 500 l. of a 25% aqueous carnauba wax dispersion. 30 kg. of a finely divided prepared white base consisting of barium sulphate and alumina is added with vigorous agitation followed in order by 45 l. of a 2% tartar emetic solution, 40 l. of a 2% tin chloride solution, 60 kg. of tannin and 100 l. of a 10% sodium carbonate solution. The purple lake precipitates out and carries down with it the wax, producing a soft purple solid which can be purified by decanting the liquid and washing with water to remove soluble salts.

Example II 60 kg. of Victoria blue are dissolved in 500 l. of a 25% aqueous mineral oil emulsion. 30 kg. of a finely divided prepared white base, consisting of barium sulphate and alumina is added with vigorous agitation; thereupon 45 l. of a 2% tartar emetic solution, 35 l. of a 2% tin chloride solution, 60 kg. of tannin and 100 l. of a 10% sodium carbonate solution are added in order.

The blue lake precipitates carrying with it all of the mineral oil and forms a soft liquid paste, which can be washed with water to remove soluble salts. The product can be used for a pigment in typewriter ribbons by incorporating in a suitable oleaginous emulsion. If desired, lard oil emulsions may be used instead of mineral oil emulsions.

Example III 30 kg. of a white base, consisting of barium sulphate and alumina is prepared by the reaction of solutions of suitable quantities of alum sodium carbonate and barium chloride in about 500 l. of a 25% aqueous carnauba wax dispersion. 60 kg. of methyl violet are then dissolved in the dispersion and 45 l. of a 2% tartar emetic solution, 40 l. of a 2% tin chloride, 60 kg. of tannin and 100 l. of a 10% sodium carbonate solution are added in order. The purple lake precipitates out, carrying down with it all of the carnauba wax and producing a product substantially the same as that in Example 1.

It is an advantage of the present invention that the amount and nature of the oleaginous material incorporated with the lake pigments can be accurately controlled, since in the case of most oleaginous dispersions, the pigment will carry down substantially all of the oleaginous material within wide limits and will retain the material even when washed to remove soluble constituents. It is thus possible to incorporate the desired amount of oleaginous material with the lake pigment in a single operation, which makes it possible in many cases to manufacture a final product, such as a pencil lead composition requiring a large proportion of hard oleaginous material, in a single manufacturing operation.

In general, the use of stabilizers, such as gums, to maintain the oleaginous dispersion is undesirable, although small amounts may be unobjectionable in certain cases. Where a stabilizing agent is desired, a small amount of alkali or a soap may be incorporated with the oleaginous dispersion and such stabilizing agents are included within the scope of the present invention.

I am not sure just what the reaction is which brings about the incorporation of oleaginous material with the pigments, but while the invention is not limited to any theory, I am of the opinion that the phenomen is essentially physical and that no definite chemical compound is formed between the pigment and the oleaginous material. I am of the opinion that the colloidal particles of precipitating pigment are electrically charged and of opposite sign to the particles of the oleaginous material and that the latter are therefore attracted to the pigment particles, adhering thereto or being adsorbed thereon. I have not been able to definitely prove this theory and while I am of the opinion that it is the most probable explanation, it is possible that later research will bring to light other causes.

The products of the present invention are, of course, very different in nature depending on the ingredients and the amounts of oleaginous material incorporated in the product. They are all, however, characterized by easy dispersion in suitable media and are physically very homogeneous showing a homogeneous texture under the microscope.

In the claims, the expression "oleaginous material" is intended to cover oily, fatty and waxy bodies, irrespective of their chemical classification and includes not only fats and oils of the glyceride type, but also hydrocarbon oils and waxes such as mineral oil, paraffin and the like. Wax alcohols and other chemical compounds of similar physical characteristics are also included, the term "oleaginous" being intended to refer to the physical characteristics of the material and in no way to the chemical characteristics.

The term "lake" will be limited to pigments which are prepared by striking dyes on insoluble substrates and does not include pigments prepared by precipitating mineral pigments on to substrates.

I have used the phrase "adsorbed with" in a non-technical sense to indicate that the particles of the pigment are held to the particles of the dispersed oleaginous material by some attractive force or surface characteristic. I do not wish to be bound by any strict meaning of the word "adsorbed" nor do I wish thereby to indicate definitely whether the particles of pigment are held on the surface of the dispersed particles of the oleaginous material or the oleaginous material covers or wets the surface of the pigment particles so as to enclose them within a film of the oleaginous material. The fact is, so nearly as I now am able to discover, that the pigment particles and the oleaginous particles do join together in some manner so that the precipitated particles of pigment are isolated, thus inhibiting further coalescence between them which would make necessary grinding of the pigment to again reduce its particle size.

This application is a division of my prior application, Serial 85,025, filed January 30, 1926.

Having thus described my invention, what I desire to secure by Letters Patent of the United States and claim is:

1. The process of preparing a composite pigment which comprises dispersing a finely divided substrate in an aqueous dispersion of oleaginous material and striking a dye on said substrate to form a lake pigment whereby the pigment particles are precipitated and carry down with them the oleaginous material.

2. The process of preparing a composite pigment which comprises preparing a dispersion of a substrate and an oleaginous material in a liquid medium containing a dye and striking the dye onto the substrate and simultaneously causing the oleaginous material to be adsorbed with the resulting pigment.

3. The process of preparing a composite pigment which comprises preparing a dispersion containing a substrate and an oleaginous material in colloidally dispersed form, adding a dye to said solution, striking the dye onto the substrate in the presence of the dispersed oleaginous material and precipitating the resulting pigment so that it is adsorbed with the oleaginous material.

4. The process as defined in claim 3 in which the dispersion is made by chemical precipitation of the substrate from a solution in which the oleaginous material is dispersed and the dye is struck onto the resulting substrate by a mordant which is adapted to precipitate the resulting pigment and to cause the pigment particles to be adsorbed with the oleaginous material.

Signed at London, England, this ninth day of August, 1926.

WILLIAM HENRY WHATMOUGH.

CERTIFICATE OF CORRECTION.

Patent No. 1,813,371.  Granted July 7, 1931, to

WILLIAM HENRY WHATMOUGH.

It is hereby certified that error appears in the printed specification of the above numbered patent requiring correction as follows: Page 2, line 46, for the numeral "1.00" read 100; and that the said Letters Patent should be read with this correction therein that the same may conform to the record of the case in the Patent Office.

Signed and sealed this 25th day of August, A. D. 1931.

(Seal)

M. J. Moore,
Acting Commissioner of Patents.